(12) United States Patent
Buzzetti et al.

(10) Patent No.: US 10,547,506 B2
(45) Date of Patent: Jan. 28, 2020

(54) DETERMINING IDENTITIES FOR EXECUTING CLOUD PROCESSING AND APPROVERS OF THE EXECUTING

(71) Applicant: International Business Machines Corporation, Armonk, NY (US)

(72) Inventors: Marie R. Buzzetti, Poughkeepsie, NY (US); Nicholas Carbone, Poughkeepsie, NY (US); John L. Czukkermann, LaGrangeville, NY (US); Michael D. Essenmacher, Danbury, CT (US); Galina Gorelik, Hyde Park, NY (US); Kirsten B. McDonald, Poughkeepsie, NY (US); Gary S. Puchkoff, Poughkeepsie, NY (US); Donald W. Schmidt, Stone Ridge, NY (US); Hiren R. Shah, Highland, NY (US); Brad D. Stilwell, Poughkeepsie, NY (US); Andrew P. Wack, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 15/377,354

(22) Filed: Dec. 13, 2016

(65) Prior Publication Data
US 2018/0167273 A1    Jun. 14, 2018

(51) Int. Cl.
*H04L 12/24* (2006.01)
*H04L 29/08* (2006.01)
*H04L 29/06* (2006.01)

(52) U.S. Cl.
CPC ......... *H04L 41/0806* (2013.01); *H04L 41/28* (2013.01); *H04L 63/00* (2013.01);
(Continued)

(58) Field of Classification Search
CPC ............... G06F 11/142; G06F 11/3608; G06F 11/3688; G06F 17/30132; G06F 8/65;
(Continued)

(56) References Cited

U.S. PATENT DOCUMENTS 5,446,903 A    8/1995 Abraham et al.
5,790,789 A    8/1998 Suarez
(Continued)

OTHER PUBLICATIONS

Carbone et al., "Configuring and Naming of Cloud Provisioning Entities," U.S. Appl. No. 15/377,427, filed Dec. 13, 2016.
(Continued)

*Primary Examiner* — Le H Luu
(74) *Attorney, Agent, or Firm* — Canton Colburn LLP; William Kinnaman

(57) ABSTRACT

A method includes configuring, by a cloud provisioning server, a first user identity to execute a provisioning to provision an instance. The instance to be provisioned includes one of an instantiated software resource and a computing service. The method also includes configuring a second user identity to be an approver of the provisioning. The method also includes performing provisioning of the instance. The provisioning is executed under the first user identity, and the second user identity has provided approval of the provisioning.

14 Claims, 13 Drawing Sheets

(52) U.S. Cl.
CPC ........ *H04L 63/0823* (2013.01); *H04L 63/102* (2013.01); *H04L 67/10* (2013.01)

(58) Field of Classification Search
CPC ................ G06F 9/45558; G06N 5/025; G06Q 10/06313; G06Q 10/06315; G06Q 30/0206; H04L 63/0807; H04L 63/083; H04L 41/0806; H04L 41/28; H04L 63/00; H04L 63/0823; H04L 63/102; H04L 67/10

See application file for complete search history.

(56) References Cited

U.S. PATENT DOCUMENTS

| | | |
|---|---|---|
| 6,854,016 B1 | 2/2005 | Kraenzel et al. |
| 6,880,129 B1 | 4/2005 | Lee et al. |
| 7,054,924 B1 | 5/2006 | Harvey et al. |
| 7,200,805 B2 | 4/2007 | Carlson et al. |
| 7,603,443 B2 | 10/2009 | Fong et al. |
| 7,673,328 B1 | 3/2010 | Kojima |
| 8,122,063 B2 | 2/2012 | Kraft et al. |
| 8,200,715 B1 | 6/2012 | Kraft et al. |
| 8,266,616 B1 | 9/2012 | Jacquot et al. |
| 8,677,318 B2 | 3/2014 | Mohindra et al. |
| 8,706,776 B1 | 4/2014 | Kraft et al. |
| 8,874,755 B1 | 10/2014 | Deklich et al. |
| 9,276,942 B2 | 3/2016 | Srinivasan et al. |
| 9,330,161 B2 | 5/2016 | D'Amato et al. |
| 2004/0083453 A1 | 4/2004 | Knight et al. |
| 2005/0271050 A1 | 12/2005 | Akgun |
| 2007/0157317 A1 | 7/2007 | Venkatachalam et al. |
| 2008/0301672 A1 | 12/2008 | Rao et al. |
| 2010/0125612 A1 | 5/2010 | Amradkar et al. |
| 2013/0091547 A1 | 4/2013 | Venkatesh et al. |
| 2013/0185431 A1 | 7/2013 | Venkatesh |
| 2014/0074973 A1 | 3/2014 | Kumar et al. |
| 2014/0075021 A1 | 3/2014 | Revanuru |
| 2014/0075565 A1 | 3/2014 | Srinivasan |
| 2015/0156218 A1 | 6/2015 | Arun et al. |
| 2015/0278397 A1 | 10/2015 | Hendrickson et al. |
| 2016/0094483 A1 | 3/2016 | Johnston et al. |
| 2016/0105393 A1 | 4/2016 | Thakkar et al. |
| 2016/0132805 A1* | 5/2016 | Delacourt ......... G06Q 10/06313 705/7.23 |
| 2016/0132808 A1* | 5/2016 | To .................... G06Q 10/06315 705/7.25 |
| 2016/0182525 A1* | 6/2016 | Zhu ....................... H04L 63/083 726/1 |
| 2016/0191411 A1 | 6/2016 | Kim et al. |
| 2016/0323183 A1 | 11/2016 | Jeuk |
| 2017/0070500 A1* | 3/2017 | Hockey ............... H04L 63/0807 |
| 2017/0140405 A1* | 5/2017 | Gottemukkala ... G06Q 30/0206 |
| 2017/0169339 A1* | 6/2017 | Dalmia .................. G06N 5/025 |
| 2017/0171146 A1 | 6/2017 | Sharma |
| 2017/0180346 A1* | 6/2017 | Suarez ................ G06F 9/45558 |
| 2017/0220448 A1* | 8/2017 | Topiwala ............ G06F 11/3688 |
| 2017/0364345 A1* | 12/2017 | Fontoura ................... G06F 8/65 |
| 2018/0032399 A1* | 2/2018 | Johnson ................ G06F 11/142 |
| 2018/0039494 A1 | 2/2018 | Lander |
| 2018/0129665 A1 | 5/2018 | Bach |
| 2018/0137139 A1* | 5/2018 | Bangalore ......... G06F 17/30132 |
| 2018/0150377 A1* | 5/2018 | Oberle ................ G06F 11/3604 |

OTHER PUBLICATIONS

Carbone et al., "Generating and Managing Names of Instances," U.S. Appl. No. 15/377,410, filed Dec. 13, 2016.
Carbone et al., "Performing Actions That Have Been Defined for Provisioned Instances," U.S. Appl. No. 15/377,398, filed Dec. 13, 2016.
List of IBM Patents or Patent Applications Treated As Related; Date Filed: Dec. 13, 2016, 2 pages.
Bertino et al. "Securing XML documents with Author-X." IEEE Internet Computing, vol. 5, Issue 3, May 2001, p. 21-31.
Gao, "Study on the Expended-Enterprise Information Portal Based on the Role Control Theory", Applied Mechanics and Materials, vols. 40-41, pp. 631-636, 2011. (Abstract only).

\* cited by examiner

FIG. 1

| Software Services | | | |
|---|---|---|---|
| Overview | Templates | Instances | |

Software Service Templates ▶ Modify NewTemplate

Modify NewTemplate

* Workflow File:

`C:\workflows\wf7\p.xml`

[ Edit ]

* Actions File:

`C:\workflows\wf7\a.xml`

Workflow Variables Input File:

Template Description:

* Software Type:

MIX

Add Approver z/OSMF User ID zosmft2

[ OK ]  [ Cancel ]

Approvers

Actions ▾

| | Approvers | Status | Item to approve | Description |
|---|---|---|---|---|
| ○ | ZMFUSER | Pending | Domain approver | Domain appro the template |

FIG. 2

Approvers

| | Status | Item to approve | Description |
|---|---|---|---|
| Approvers | | | |
| ZMFUSER | ☐ Pending | Domain approver | Domain approval the template cont |
| zosmft2 | ☐ Pending | Template overall | General approval the template cont |

Software Services

| Overview | Templates | Instances |

Software Service Templates

Actions ▼ | Add Template

⇅ No filter applied  450

| | Template Name Filter | Version Filter | State Filter | Software Type Filter | Created by Filter |
|---|---|---|---|---|---|
| ☐ | a | 1 | ☑ Published | MIX | ZOSMFAD |
| ☐ | b | 1 | ☑ Published | MIX | ZOSMFAD |
| ☐ | c | 1 | 📄 Draft Pending Approvals | MIX | ZOSMFAD |
| ☐ | NewTemplate | 1 | 📄 Draft Approved | MIX | ZOSMFAD |

Software Services

| Overview | Templates | Instances |

Software Service Templates ▷ NewTemplate Approvals

NewTemplate Approvals

Template Name: NewTemplate

Template Description:

Approvers
Required Approvals for steps or actions in the template

Actions ▼

| | Approvers | Status | Item to approve |
|---|---|---|---|
| ☐ | 510 | | |
| ☑ | ZMFUSER | ☐ Pending | Domain approver |
| ☐ | zosmft2 | ☑ Approved | Template overall |

↙ 530

Reject Item

Reject Items
Domain approver

Comments

[ OK ] [ Can ]
↖ 540

FIG. 5

Workflow Editor

[File Path: C:\workflows\wf8\p.xml (read only)]

| Metadata | Steps | Variables | Input Properties |

* Workflow ID:
wfID

Default Name:
Mix3

* Description:
Mix1 workflow

* Version:
1.0

* Vendor:
IBM

Category:
Provisioning ▷

* Product ID:
prodID

* Product Name:
Product Name

* Product Version:
Version 1

* Software Type:
MIX

☐ Add to registry

DETERMINING IDENTITIES FOR EXECUTING CLOUD PROCESSING AND APPROVERS OF THE EXECUTING

BACKGROUND

One or more embodiments relate in general to determining identities for executing cloud processing, and to determining approvers of such execution. More specifically, one or more embodiments relate to determining user identities that perform steps for provisioning instances, and/or determining user identities that perform actions on provisioned instances.

"Provisioning" generally relates to configuring, managing, and providing of computing software resources and/or computing services. In the context of a cloud provisioning environment, a cloud provider can configure, provide, and manage computing software resources and/or services that are allocated to a user. Software resources and services are provisioned to users by providing the users with instantiations ("instances") of the software resources and services.

SUMMARY

According to one or more embodiments, a method includes configuring, by a cloud provisioning server, a first user identity to execute a provisioning to provision an instance. The instance to be provisioned includes one of an instantiated software resource and a computing service. The method also includes configuring a second user identity to be an approver of the provisioning. The method also includes performing provisioning of the instance. The provisioning is executed under the first identity, and the second user identity has provided approval of the provisioning step.

According to one or more embodiments, a computer system includes a memory. The computer system also includes a processor system communicatively coupled to the memory. The processor system is configured to perform a method including configuring a first user identity to execute a provisioning to provision an instance. The instance to be provisioned includes one of an instantiated software resource and a computing service. The method also includes configuring a second user identity to be an approver of the provisioning. The method also includes performing provisioning of the instance. The provisioning is executed under the first identity, and the second user identity has provided approval of the provisioning.

According to one or more embodiments, a computer program product is provided. The computer program product includes a computer-readable storage medium. The computer-readable storage medium has program instructions embodied therewith. The computer-readable storage medium is not a transitory signal per se, the program instructions readable by a processor system to cause the processor system to perform a method. The method includes configuring, by a cloud provisioning server, a first user identity to execute a provisioning to provision an instance. The instance to be provisioned includes one of an instantiated software resource and a computing service. The method also includes configuring a second user identity to be an approver of the provisioning. The method also includes performing provisioning of the instance. The provisioning is executed under the first identity, and the second user identity has provided approval of the provisioning.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

FIG. 1 depicts an interface that displays creating/configuring a template approver within a domain, in accordance with one or more embodiments;

FIG. 2 depicts an interface that displays creating/configuring a template, in accordance with one or more embodiments;

FIG. 3 depicts an interface that displays template content items that need to be approved by domain and template approvers, in accordance with one or more embodiments;

FIG. 4 depicts an interface that displays a list of different templates and a listing of states of these templates, in accordance with one or more embodiments;

FIG. 5 depicts an interface that allows a domain approver to reject a template content item, and/or that allows a template approver to reject a template content item, in accordance with one or more embodiments;

FIG. 8 depicts an interface that displays metadata information, in accordance with one or more embodiments;

DETAILED DESCRIPTION

Figure 6:
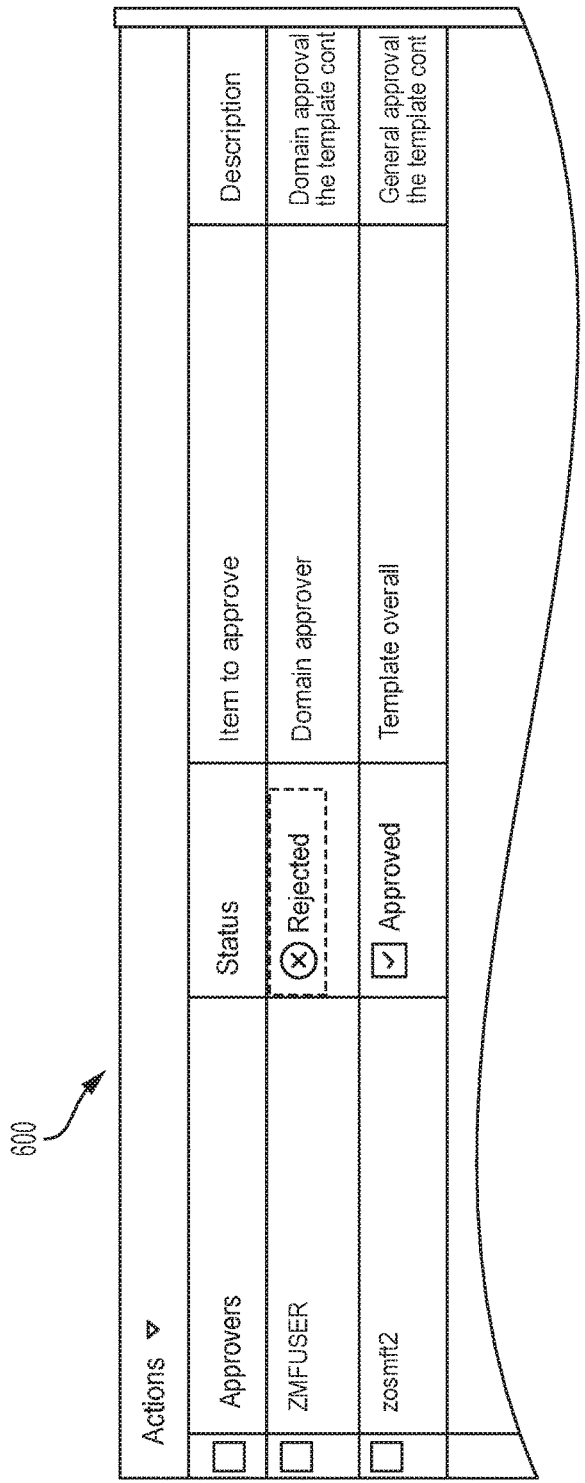
FIG. 6 depicts an interface that indicates that a domain approver has rejected a template content item, in accordance with one or more embodiments.

In accordance with one or more embodiments, methods and computer program products for determining identities for executing cloud processing, and for determining approvers of such execution, are provided. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

It is also understood in advance that although this disclosure includes a detailed description on cloud computing, implementation of the teachings recited herein are not limited to a cloud computing environment. Rather, one or more embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

As discussed above, "provisioning" generally relates to configuring, managing, and providing of computing software resources and/or computing services. One example of provisioning computing resources/services is the provisioning of a software instance. A software instance can be a specific realization of a software application when the application is run. When a particular software instance has been provisioned to a user, the user can then want to perform different actions with the software instance. The actions can vary based on the type of the particular software, and the actions can vary based on the intended use of the particular software that has been instantiated. These additional actions can also be predefined by a service provider of the software.

One type of provisioning may be the provisioning of middleware software and services. With the previous approaches of deploying and installing middleware software/services, the services of a group of system programmers is typically required, due to the specialized experience that is necessary to perform such installation. In the course of installing the middleware software/service, different steps need to be performed under certain identities. In other words, different steps of the installation needed to be authorized by certain individuals. However, the previous approaches generally did not provide any way to coordinate between the steps of the installation and the individuals with authority to execute/perform the steps. The previous approaches also generally did not provide any way to coordinate between the individuals with authority to execute/perform the installation steps and the approvers who granted the authority to the individuals.

In view of the difficulties associated with the previous approaches, one or more embodiments coordinate between the steps of the installation and the individuals that are to execute/perform the steps. One or more embodiments also provide a way to coordinate between the individuals that are to execute/perform the installation steps and the approvers who grant the authority to these individuals to execute/perform the installation steps, as described in more detail below.

One or more embodiments can provision instances using templates, as described in more detail below. A template can generally refer to a file format that includes data for provisioning resources and services. For example, a template can contain a provisioning Extensible Markup Language (XML) document/file. The provisioning XML file can define steps for performing a provisioning of a software/service. A template can also contain an actions.xml file. The actions.xml file can define actions that can be performed after the software/service is provisioned. What the actions are, and what the actions do, can be defined by the contents of the actions.xml file, for example.

When attempting to perform provisioning of an instance of software or an instance of a service, the provisioning can fail if the steps of the provisioning are not performed under the proper user identities. In other words, the steps of the provisioning possibly need to be executed by certain user identities that are authorized to execute the steps. There may be a limited group of identities that are authorized to execute the steps of the provisioning. In order to ensure that the steps of the provisioning are executed under the proper user identities, there is a need to facilitate/coordinate between the steps of the provisioning and the proper user identities, so that each step is executed under the proper user identity.

In view of the above, one or more embodiments are directed to methods that can: (1) define user identities for which the above-described steps/actions are to be executed under, (2) define approvers that provide the determined user identities with the authority to execute the steps/actions, and/or (3) lock down a specification that has been granted approval by the approvers. With regard to (2), approvers provide certain user identities with the authority to perform steps for provisioning instances and/or the authority to perform actions for provisioned instances. Approvers can provide their approval at different logical levels. For example, one or more embodiments can configure approvers to provide their approval at a domain level and/or at a template level, as described in more detail below. One or more embodiments can also configure each approver with a particular digital signature.

With regard to (3), "locking down" a specification can generally refer to preventing further changes to a specification after the specification has been approved of by the approvers. A specification can be data that includes steps for provisioning an instance and/or actions that can be performed on a provisioned instance. One example of a specification is a template, which includes an actions.xml file and/or a provisioning XML file, as described above. In the event that a template does not meet the approval of an approver, the approver can want to edit the template. As such, one or more embodiments can also provide a link between the approver and an editor of the template file, in order to allow the approver to edit the template file, as described in more detail below.

As described above, one or more embodiments can be directed to defining/configuring which user identities are authorized for executing steps, where the steps perform the provisioning of an instance. The steps for provisioning the instance can be specified, for example, by step element tags that are contained within a provisioning XML file. Referring to the following example step element, the attributes within the "start" and "end" tags of the step element define the step:

```
<step name="Step-2">
</step>
```

For a particular step, the provisioning XML file can indicate that the particular step needs to be executed under a particular user identity. Referring to the following example step element, a "runAsUser" element defines an identity that the step is to be executed under:

```
<step name="Step-2">
<runAsUser>zosmft1</runAsUser>
</step>
```

In the example immediately above, the user identity "zosmft1" is the identity that is needed to execute step "Step-2."

In addition to configuring which identities are to execute steps for performing provisioning, one or more embodiments can also be directed to configuring which user identities are authorized for performing actions upon a provisioned instance, after the provisioning has occurred. The actions that can be performed on a provisioned instance can be specified, for example, by action element tags. The action element tags can be contained within an actions XML file, for example. The attributes within the "start" and "end" tags of the action element define the action:

```
<action name="command1">
</action>
```

For a particular action, the actions XML file can indicate that the particular action needs to be performed by a particular user identity. Referring to the following example action element, a "runAsUser" element defines an identity that is to perform the action.

```
<action name="command1">
  <runAsUser>zosmft1</runAsUser>
</action>
```

In the example shown immediately above, the user identity "zosmft1" is the identity that is needed to execute action "command1." As described above, the "runAsUser" element can be utilized for configuring a user for either a step for provisioning an instance or an action upon a provisioned instance. A provisioning server can use facilities that are available, for example, in an application server, in order to ensure that an appropriate "runAsUser" identity is executing the step or performing the action.

In view of the above, approvers can provide the above-described user identities with authority to execute steps or with the authority to perform actions. With one or more embodiments, the approvers can provide their approval at different logical levels. For example, approvers can be domain approvers, template approvers, step approvers, and/or action approvers, as described in more detail below. A template approver can also be referred to as a general approver.

A domain can generally be a container that groups templates, resources, and/or deployed instances, where the templates, resources, and deployed instances share one or more characteristics. The shared characteristic between the templates, resources, and instances can be that they correspond to a same corporate department (i.e., an accounting department and/or an application development department), and/or a same set of served customers, for example.

A domain can be created/configured by an administrator. The administrator can create/configure the domain using a user interface (UI) on a provisioning server, for example. In other embodiments, the UI can be generated/implemented by a computer/server of an end user. When a domain is created/configured, the administrator can also specify/determine one or more approvers for templates that are created in the domain.

In view of the above, with one or more embodiments, a domain approver must grant or deny approval for all templates in the entire domain. A template approver must grant or deny approval for the template that the template approver is associated with, where each template is within a domain. A step approver must grant or deny approval for each step that the step approver is associated with in a template, where each step is within a template. Finally, with one or more embodiments, an action approver must grant or deny approval for each action that the action approver is associated with in a template, where each action is within a template.

With certain embodiments, in order to perform a particular step/action, approval will need to be obtained from all the approvers that are associated with the template. For example, with certain embodiments, in order to perform a step/action, approval will need to be obtained from (1) the corresponding step/action approver, (2) the template approver that approves the template for which the step/action belongs to, and (3) the domain approver that approves the templates within the domain.

Figure 1:
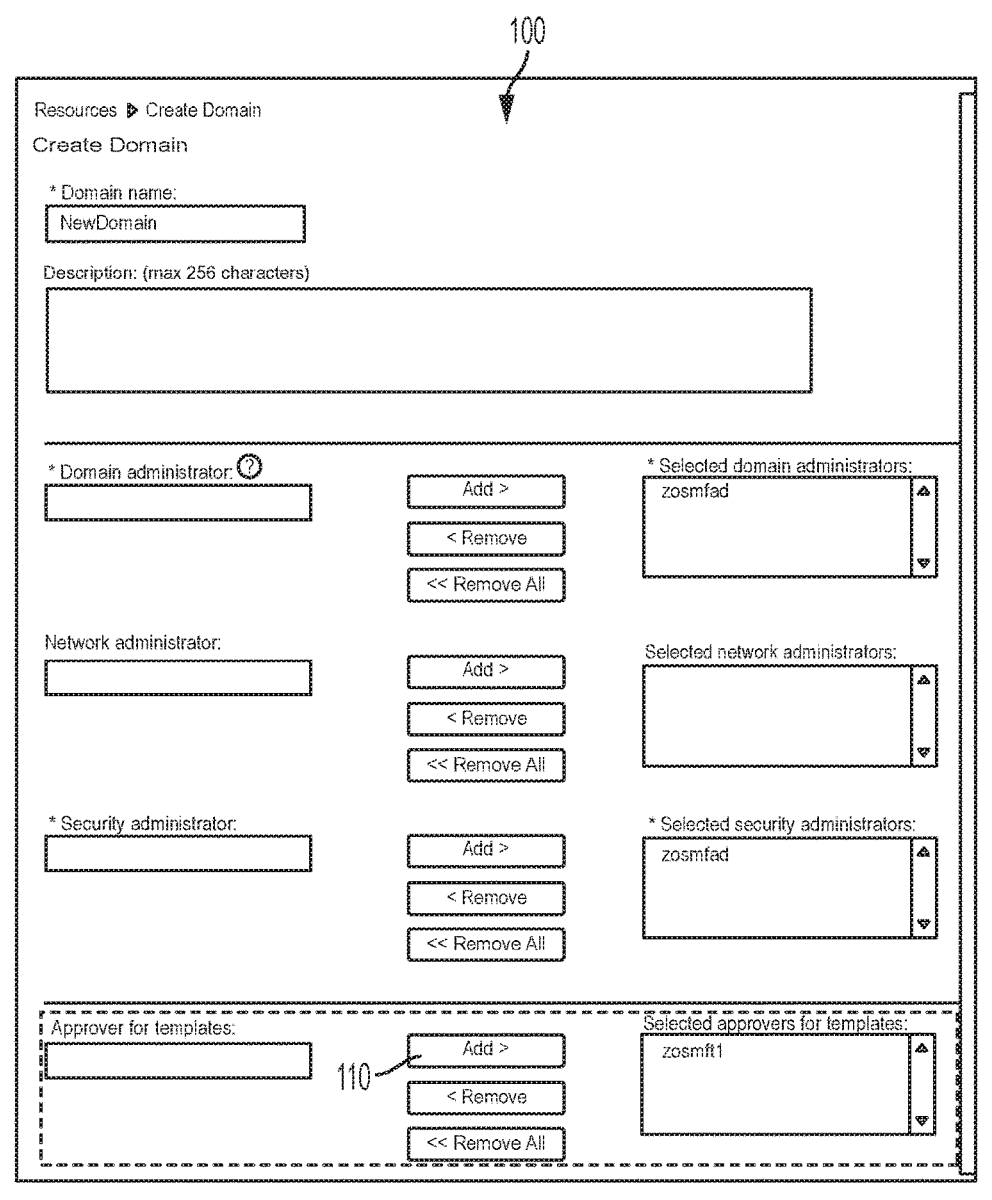

FIG. 1 depicts an interface 100 that displays creating/configuring a template approver within a domain, in accordance with one or more embodiments. Referring to interface 100, a domain named "NewDomain" has been created. An administrator can specify one or more approvers for all templates that are created within the domain. For example, referring to FIG. 1, a user can specify/determine an approver "zosmft1," and the user can confirm the approver by clicking add button 110. Approver "zosmft1" is configured to be the approver of each template within domain "NewDomain."

In addition to configuring a template approver to grant/deny approval over each template within an entire domain, one or more embodiments can also configure a template approver that grants/denies approval over a single template. FIG. 2 depicts an interface 200 that displays creating/configuring a template, in accordance with one or more embodiments. Interface 200 can be implemented by a provisioning server, for example. With other embodiments, interface 200 can be implemented by a computer/server of an end user. Referring to interface 200, one or more embodiments can allow modification/creation of template "NewTemplate." Interface 200 also allows the administrator to add an approver of the template. In the present example, the administrator can add approver "zosmft2" as an approver of template "NewTemplate." The scope for the specified template approvers is at the template level.

FIG. 3 depicts an interface 300 that displays template content items that need to be approved by domain and template approvers, in accordance with one or more embodiments. After approvers have been added (via, for example, interface 200), interface 300 illustrates that the approval of the following approvers is needed. For example, approval from approver "ZMFUSER" is still "pending." Approver "ZMFUSER" is a domain-level approver. Further, approval from approver "zosmft2" is also still "pending." Approver "zosmft2" is a template-level approver.

In addition to configuring domain approvers and template approvers, one or more embodiments can designate approvers for steps (for provisioning instances) and approvers for actions (for performing actions on the provisioned instances). Within provisioning XML and/or actions XML files of a template, one or more approver element tags can be added following a "runAsUser" element. The one or more approver element tags can determine the approvers that need to approve the identities that the corresponding step/action needs to be performed under. An approver element tag can contain multiple user identities for approving a step or action.

With one or more embodiments, if more than one user identity is specified within separate <approver> tags, then each specified user identity needs to approve the step (and approve of the user identities that are configured to execute the step). For example, referring to the example below, both approver "zosmfad" and approver "zosmfa2" need to approve step "Step-2" being executed under user "zosmft1."

```
<step name="Step-2">
  <runAsUser>zosmft1</runAsUser>
  <approver>zosmfad</approver>
  <approver>zosmfa2</approver>
</step>
```

One or more embodiments can also determine a plurality of approvers, where a step/action is approved as long as any one of the plurality of approvers has provided approval. Referring to the example below, any one of approvers "zosmfad," "zosmfa2," or "zosmfa3" can approve action "command1" being performed by user "zosmft1."

```
<action name="command1">
  <runAsUser>zosmft1</runAsUser>
  <approver>zosmfad zosmfa2 zosmfa3</approver>
</action>
```

One or more embodiments can also be implemented in accordance with one or more of the following rules for template approval. Each "runAsUser" element can have up to 12 approver tag elements, which can designate up to 12 approvers. As an example of another rule, if a step or action has a designated "runAsUser" element, but does not include any designated approver element, then at least one domain approver or template approver is needed to provide approval. As an example of another rule, if a step or action has a designated approver element, but does not have a designated "runAsUser element," then the approver element can be ignored, without being used. As an example of another rule, multiple domain approvers and template approvers can be configured. As an example of another rule, in order for the steps/actions of a template to be executed/performed, all approvers need to provide their approval for the steps or actions that are to be executed/performed.

Next, as domain, template, action, and step approvers are configured, one or more embodiments also allow approvers to provide their approval, deny their approval, and/or edit the specification/template. In order to provide approval of templates, an approver can perform one or more of the following steps. The approver can log into a user interface. Within the user interface, the approver can navigate to the template that requires approval. Next, the approver can select the "Approvers" action. Next, the approver can click the "Approve" action that corresponds to the approver's user identity. Finally, the approver can then click "OK" to approve of the template.

Before the template is approved, or if the template is further modified subsequent to the provided approval, then the provisioning server can consider the state of the template to be "Draft Pending Approvals." After proper approval is received, the template can be "Approved." With one or more embodiments, if a template has a "runAsUser" element in a step or action, but the step/action does not include any designated approver element, nor any designated domain approver, nor any designated template approver, then the state of the template can be set to "Draft Missing Required Approver."

Once a template has been properly approved of by the necessary approvers, one or more embodiments can prevent further changes to the template. After a template has been approved, the template can be published using a "Publish" action. Locking down can occur as a part of the publish action. The provisioning server can maintain its own copy of the template in the provisioning server's own protected persistence storage. In the process of locking down the template, the provisioning server may insert a certificate inside the template file as a manner of digitally signing the template file. With one or more embodiments, the inserted certificate inside the template file can ensure that updates are not performed outside of the provisioning server's control.

A certificate can be generated using a key store and by using data within the template. The certificate can then be maintained in the source code of the template. Before data from a template is used for provisioning, the provisioning server can use the key store and the certificate in the template to validate the integrity of the template.

FIG. 4 depicts an interface 400 that displays a list of different templates (410, 420, 430, and 440) and a listing of the states 450 of these templates, in accordance with one or more embodiments. As shown by interface 400, template "a" 410 and template "b" 420 have been "Published," and template "c" 430 is a "Draft Pending Approvals" that still needs to be approved. Template "NewTemplate" 440 is "Draft Approved," but not yet published.

In addition to receiving approval from approvers, one or more embodiments also allow an approver to indicate rejection of a template content item. FIG. 5 depicts an interface 500 that allows a domain approver (such as "ZMFUSER" 510) to reject a template content item, and/or allows a template approver to reject a template content item, in accordance with one or more embodiments. Referring to FIG. 5, in order to reject a template content item via user interface 500, approver "ZMFUSER" can perform one or more of the following steps. The approver can log into user interface 500. Next, approver "ZMFUSER" can then navigate to the template content item that requires approval. Approver "ZMFUSER" can then select the "Approvers" action 530. Approver "ZMFUSER" can then click a "Reject" action in order to reject the template content item. The approver can then click "OK" button 540 to confirm rejection of the template content item.

FIG. 6 depicts an interface 600 that indicates that a domain approver has rejected a template content item, in accordance with one or more embodiments. Specifically, after approver "ZMFUSER" confirms rejection of the template content item, interface 600 can indicate that "ZMFUSER" has rejected the template content item.

Figure 7:
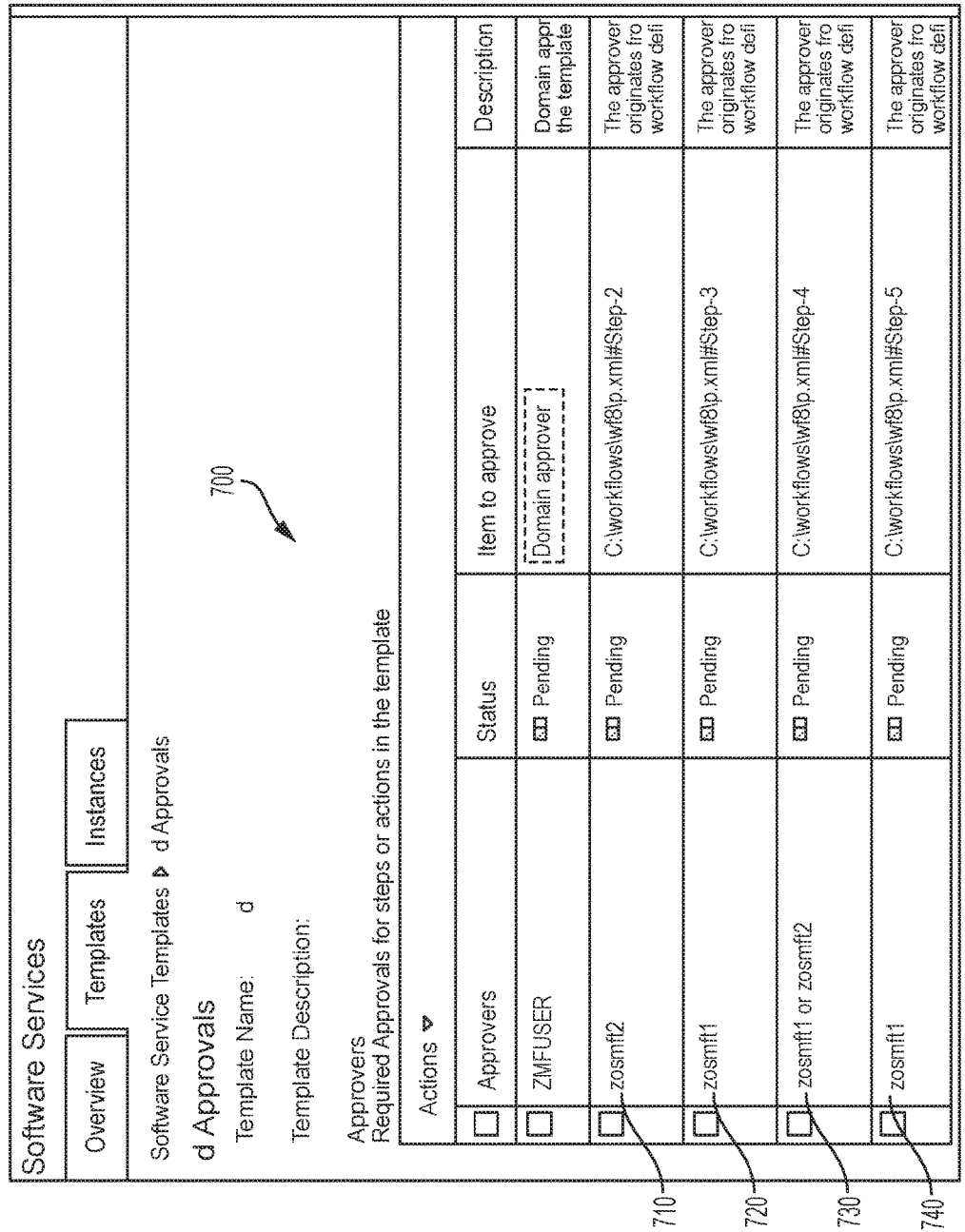
FIG. 7 depicts an interface that displays different approvers, where certain approvers can be step approvers, in accordance with one or more embodiments.

In addition to displaying template approvers and domain approvers, the interface can also display other types of approvers. For example, FIG. 7 depicts an interface 700 that displays different approvers, where certain approvers can be step approvers (710, 720, 730, and 740), in accordance with one or more embodiments.

In addition to enabling approvers to provide approval or disapproval of a template, one or more embodiments can also display metadata information regarding the content of the template, for example. FIG. 8 depicts an interface 800 that displays metadata information, in accordance with one or more embodiments. For example, the provisioning server can provide a "read only" editor link that displays different metadata. If the approval is for a step, the editor view can include the details of the step. In the event that an approver wishes to edit a template, one or more embodiments can also provide an editor that allows editing of the template.

Figure 9:
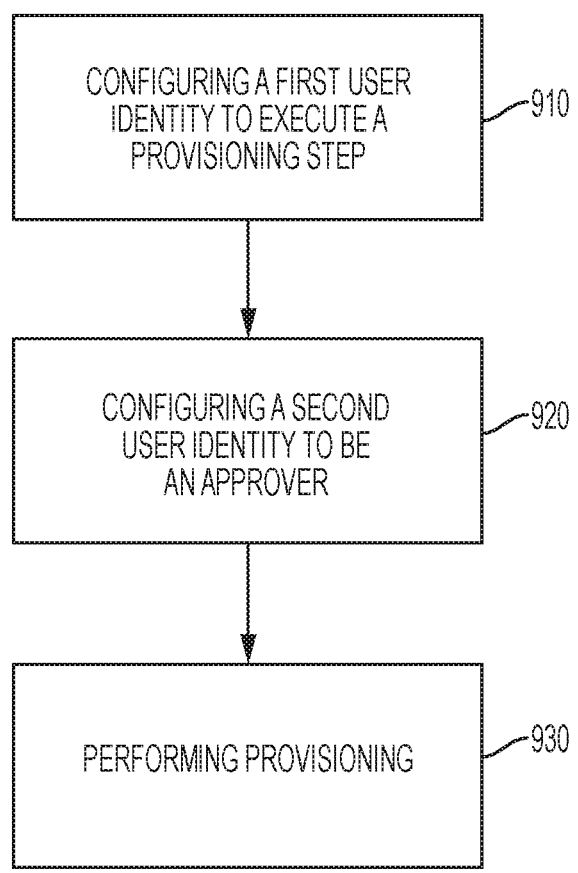
FIG. 9 depicts a flowchart of a method in accordance with one or more embodiments.

FIG. 9 depicts a flowchart of a method in accordance with one or more embodiments. The method includes, at block 910, configuring, by a cloud provisioning server, a first user identity to execute a provisioning to provision an instance. The instance to be provisioned comprises one of an instantiated software resource and a computing service. The method can also include, at block 920, configuring a second user identity to be an approver of the provisioning. The method can also include, at block 930, performing provisioning of the instance. The provisioning is executed under the first identity, and the second user identity has provided approval of the provisioning.

Figure 10:
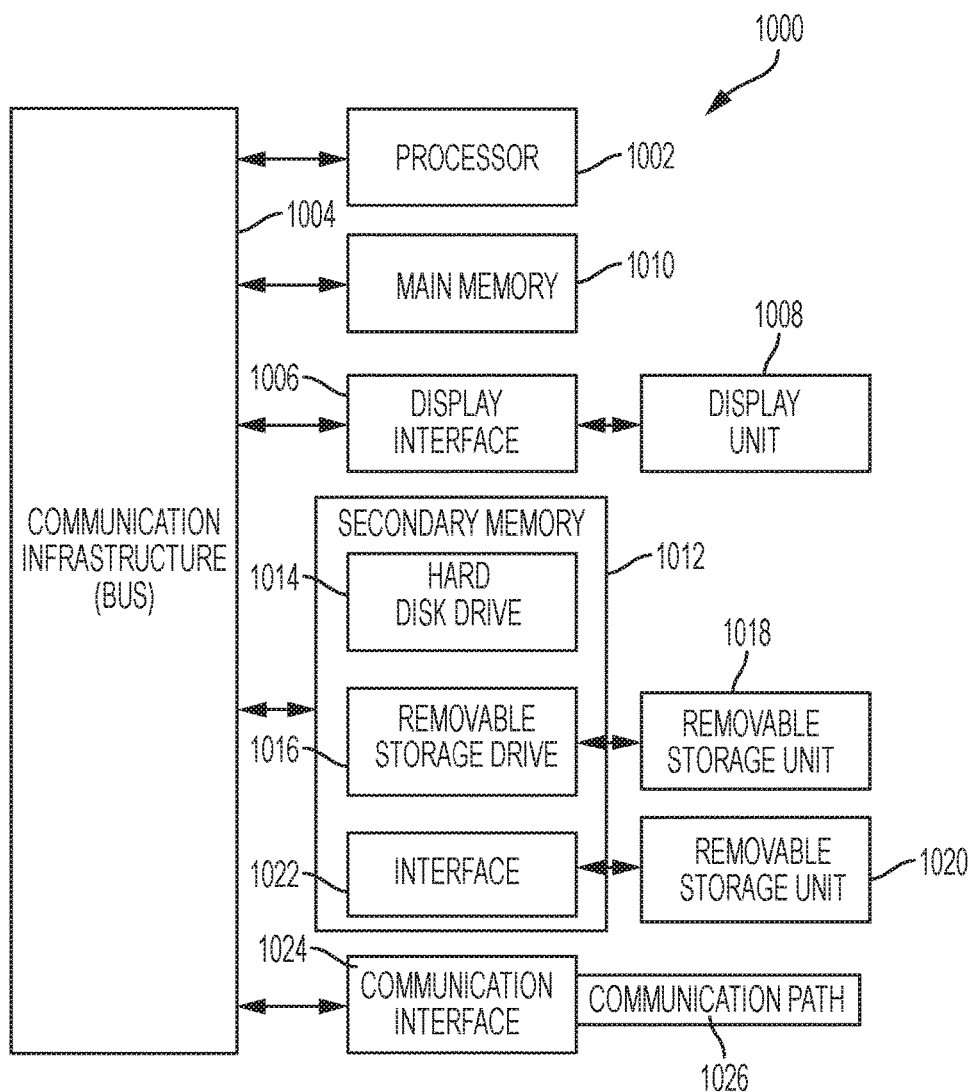
FIG. 10 depicts a high-level block diagram of a computer system, which can be used to implement one or more embodiments.

FIG. 10 depicts a high-level block diagram of a computer system 1000, which can be used to implement one or more embodiments. More specifically, computer system 1000 can be used to implement hardware components of systems capable of performing methods described herein. For example, computer system 1000 can be used to implement the hardware components of a provisioning server. Although one exemplary computer system 1000 is shown, computer system 1000 includes a communication path 1026, which connects computer system 1000 to additional systems (not depicted) and can include one or more wide area networks (WANs) and/or local area networks (LANs) such as the Internet, intranet(s), and/or wireless communication network(s). Computer system 1000 and additional system are in communication via communication path 1026, e.g., to communicate data between them.

Computer system 1000 includes one or more processors, such as processor 1002. Processor 1002 is connected to a communication infrastructure 1004 (e.g., a communications bus, cross-over bar, or network). Computer system 1000 can include a display interface 1006 that forwards graphics, textual content, and other data from communication infrastructure 1004 (or from a frame buffer not shown) for display on a display unit 1008. Computer system 1000 also includes a main memory 1010, preferably random access memory (RAM), and can also include a secondary memory 1012. Secondary memory 1012 can include, for example, a hard disk drive 1014 and/or a removable storage drive 1016, representing, for example, a floppy disk drive, a magnetic tape drive, or an optical disc drive. Hard disk drive 1014 can be in the form of a solid state drive (SSD), a traditional magnetic disk drive, or a hybrid of the two. There also can be more than one hard disk drive 1014 contained within secondary memory 1012. Removable storage drive 1016 reads from and/or writes to a removable storage unit 1018 in a manner well known to those having ordinary skill in the art. Removable storage unit 1018 represents, for example, a floppy disk, a compact disc, a magnetic tape, or an optical disc, etc. which is read by and written to by removable storage drive 1016. As will be appreciated, removable storage unit 1018 includes a computer-readable medium having stored therein computer software and/or data.

In alternative embodiments, secondary memory 1012 can include other similar means for allowing computer programs or other instructions to be loaded into the computer system. Such means can include, for example, a removable storage unit 1020 and an interface 1022. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 1020 and interfaces 1022 which allow software and data to be transferred from the removable storage unit 1020 to computer system 1000.

Computer system 1000 can also include a communications interface 1024. Communications interface 1024 allows software and data to be transferred between the computer system and external devices. Examples of communications interface 1024 can include a modem, a network interface (such as an Ethernet card), a communications port, or a PC card slot and card, a universal serial bus port (USB), and the like. Software and data transferred via communications interface 1024 are in the form of signals that can be, for example, electronic, electromagnetic, optical, or other signals capable of being received by communications interface 1024. These signals are provided to communications interface 1024 via communication path (i.e., channel) 1026. Communication path 1026 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 1010 and secondary memory 1012, removable storage drive 1016, and a hard disk installed in hard disk drive 1014. Computer programs (also called computer control logic) are stored in main memory 1010 and/or secondary memory 1012. Computer programs also can be received via communications interface 1024. Such computer programs, when run, enable the computer system to perform the features discussed herein. In particular, the computer programs, when run, enable processor 1002 to perform the features of the computer system. Accordingly, such computer programs represent controllers of the computer system. Thus it can be seen from the forgoing detailed description that one or more embodiments provide technical benefits and advantages.

Figure 11:
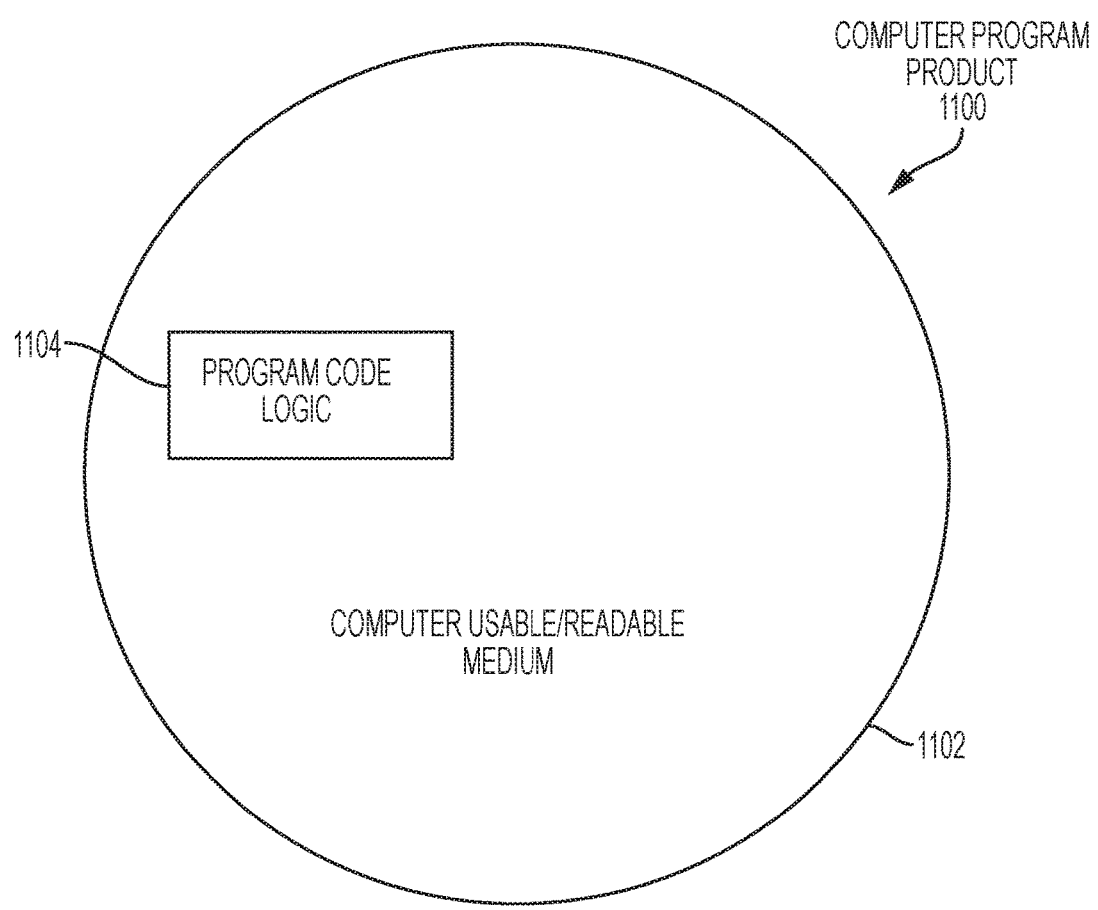
FIG. 11 depicts a computer program product, in accordance with an embodiment.

Referring now to FIG. 11, a computer program product 1100 in accordance with an embodiment that includes a computer-readable storage medium 1102 and program instructions 1104 is generally shown.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
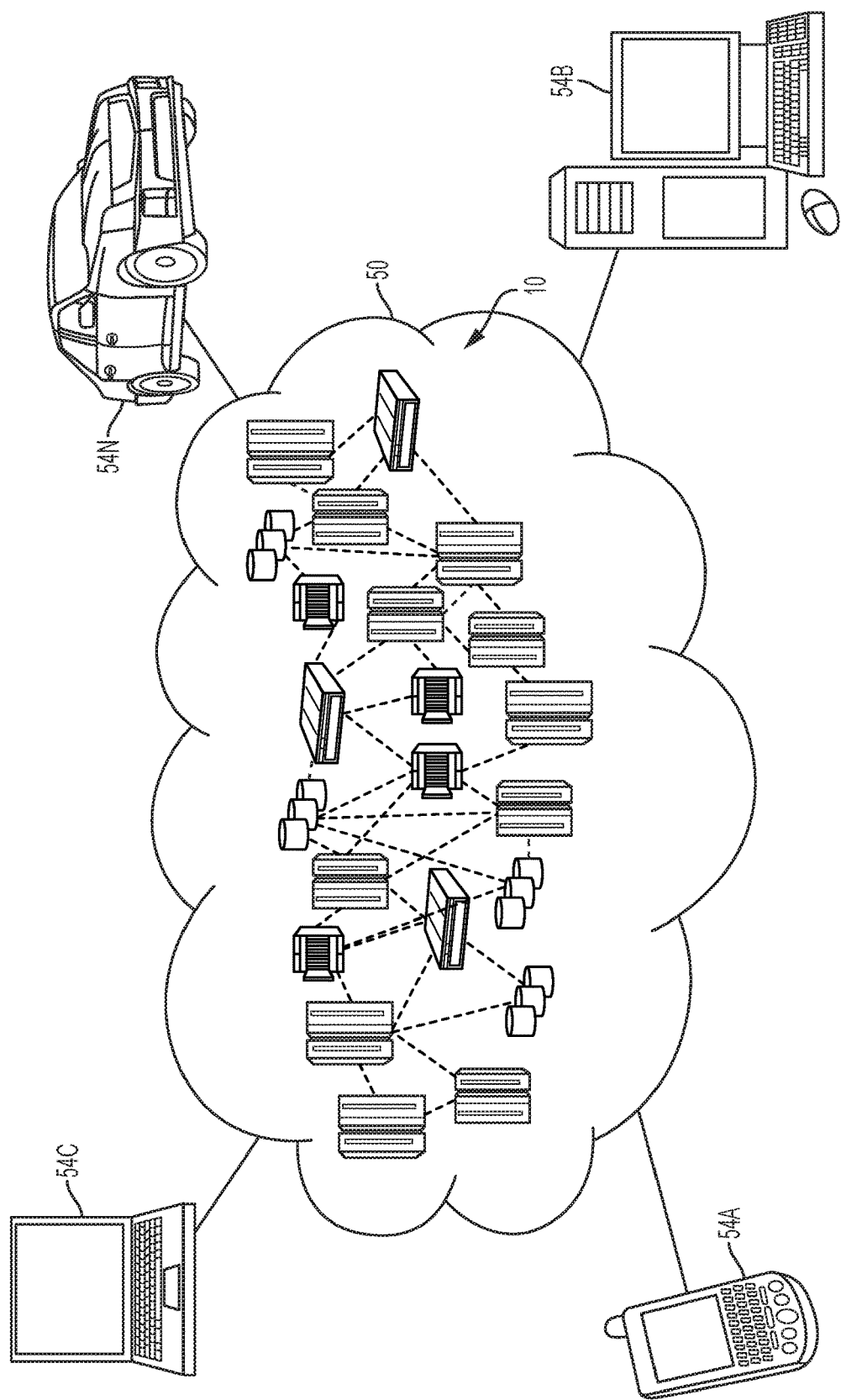
FIG. 12 depicts a cloud computing environment according to an embodiment.

FIG. 12 depicts a cloud computing environment according to an embodiment. Referring FIG. 12, illustrative cloud computing environment 50 is depicted. As described above, one or more embodiments can be implemented within a cloud computing environment. For example, an enterprise application store and/or an enterprise mobile device management system can be implemented within a cloud computing environment. Further, a system (such as a provisioning server, for example) that performs the method of FIG. 9 can also be implemented within a cloud computing environment, for example. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 12 are intended to be illustrative only and that computing nodes 10 and cloud computing environment 50 can communicate with any type of computerized device over any type of network and/or network addressable connection (e.g., using a web browser).

Figure 13:
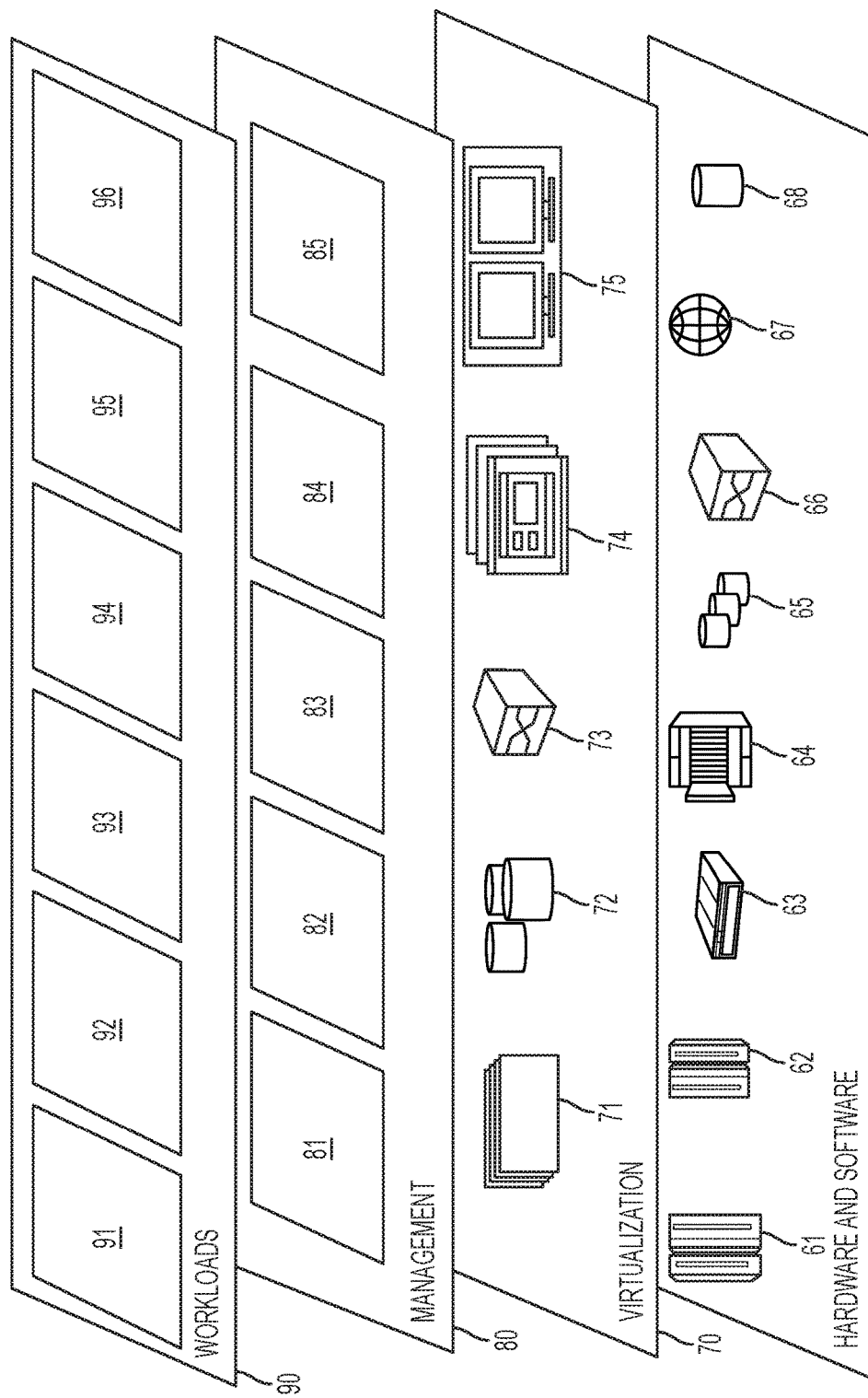
FIG. 13 depicts abstraction model layers according to an embodiment.

FIG. 13 depicts abstraction model layers according to an embodiment. Referring to FIG. 13, a set of functional abstraction layers provided by cloud computing environment 50 (FIG. 12) is shown. It should be understood in advance that the components, layers, and functions shown in FIG. 13 are intended to be illustrative only and embodiments are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and provisioning instances 96.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer implemented method, the method comprising:
    configuring, by a processor, a first user identity to execute a provisioning to provision an instance using a provisioning file, wherein the instance to be provisioned comprises one of an instantiated software resource and a computing service, wherein the provisioning file includes one or more step elements describing one or more steps to be performed under the first user identity to provision the instance, and wherein configuring the first user identity to execute the provisioning comprises configuring a <runAsUser> tag in the provisioning file;
    configuring, by the processor, a second user identity to be an approver of the provisioning;
    performing, by the processor; provisioning of the instance using a template file, wherein the provisioning is executed under the first user identity, and the second user identity has provided approval of the provisioning; and
    locking, by the processor, the template file to prevent further changes to the template file after the template file is approved and published, wherein locking the template file comprises inserting a digital certificate inside the template file.

2. The computer implemented method of claim 1 further comprising:
    configuring, by the processor, a third user identity to perform an action of the provisioned instance;
    configuring, by the processor, a fourth user identity to be an approver of the action; and
    performing, by the processor, the action of the provisioned instance, wherein the action is performed under the third user identity, and the fourth user identity has provided approval of the performed action.

3. The computer implemented method of claim 2, wherein the fourth user identity is configured to be an action approver, a template approver, and/or a domain approver.

4. The computer implemented method of claim 1, wherein the second user identity is configured to be a step approver, a template approver, and/or a domain approver.

5. The computer implemented method of claim 2, wherein configuring the second user identity or the fourth user identity comprises configuring an <approver> tag.

6. A computer system comprising:
    a memory; and
    a processor system communicatively coupled to the memory;
    the processor system configured to perform a method comprising:
        configuring a first user identity to execute a provisioning to provision an instance using a provisioning file, wherein the instance to be provisioned comprises one of an instantiated software resource and a computing service, wherein the provisioning file includes one or more step elements describing one or more steps to be performed under the first user identity to provision the instance, and wherein configuring the first user identity to execute the provisioning comprises configuring a <runAsUser> tag in the provisioning file;
        configuring a second user identity to be an approver of the provisioning;
        performing provisioning of the instance using a template file, wherein the provisioning is executed under the first user identity, and the second user identity has provided approval of the provisioning; and
        locking, by the processor, the template file to prevent further changes to the template file after the template file is approved and published, wherein locking the template file comprises inserting a digital certificate inside the template file.

7. The computer system of claim 6, wherein the method further comprises:
    configuring a third user identity to perform an action of the provisioned instance;
    configuring a fourth user identity to be an approver of the action; and
    performing the action of the provisioned instance, wherein the action is performed under the third user identity, and the fourth user identity has provided approval of the performed action.

8. The computer system of claim 7, wherein the fourth user identity is configured to be an action approver, a template approver, and/or a domain approver.

9. The computer system of claim 7, wherein configuring the second user identity or the fourth user identity comprises configuring an <approver> tag.

10. The computer system of claim 6, wherein the second user identity is configured to be a step approver, a template approver, and/or a domain approver.

11. A computer program product comprising:
    a computer-readable storage medium having program instructions embodied therewith, wherein the computer-readable storage medium is not a transitory signal per se, the program instructions readable by a processor system to cause the processor system to perform a method comprising:

configuring, by a cloud provisioning server, a first user identity to execute a provisioning to provision an instance using a provisioning file, wherein the instance to be provisioned comprises one of an instantiated software resource and a computing service, wherein the provisioning file includes one or more step elements describing one or more steps to be performed under the first user identity to provision the instance and wherein configuring the first user identity to execute the provisioning comprises configuring a <runAsUser> tag in the provisioning file;

configuring a second user identity to be an approver of the provisioning;

performing provisioning of the instance using a template file, wherein the provisioning is executed under the first user identity, and the second user identity has provided approval of the provisioning; and locking, by the processor, the template file to prevent further changes to the template file after the template file is approved and published, wherein locking the template file comprises inserting a digital certificate inside the template file.

12. The computer program product of claim 11, wherein the method further comprises:

configuring a third user identity to perform an action of the provisioned instance;

configuring a fourth user identity to be an approver of the action; and performing the action of the provisioned instance, wherein the action is performed under the third user identity, and the fourth user identity has provided approval of the performed action.

13. The computer program product of claim 12, wherein the fourth user identity is configured to be an action approver, a template approver, and/or a domain approver.

14. The computer program product of claim 11, wherein the second user identity is configured to be a step approver, a template approver, and/or a domain approver.

* * * * *